United States Patent
Lin (10) Patent No.: US 11,173,784 B2
(45) Date of Patent: Nov. 16, 2021

(54) FUEL TANK STRUCTURE OF ALL-TERRAIN VEHICLE

(71) Applicant: KWANG YANG MOTOR CO., LTD., Kaohsiung (TW)

(72) Inventor: Chuang-Hsiung Lin, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 254 days.

(21) Appl. No.: 16/503,642

(22) Filed: Jul. 5, 2019

(65) Prior Publication Data

US 2020/0070650 A1      Mar. 5, 2020

(30) Foreign Application Priority Data

Aug. 31, 2018  (TW) ................................ 107211990

(51) Int. Cl.
*B60K 15/067*  (2006.01)
*B60K 15/073*  (2006.01)
*B60K 15/063*  (2006.01)

(52) U.S. Cl.
CPC .......... *B60K 15/067* (2013.01); *B60K 15/073* (2013.01); *B60K 2015/0638* (2013.01)

(58) Field of Classification Search
CPC . B60K 15/0638; B60K 15/067; B60K 15/073
See application file for complete search history.

(56) References Cited

U.S. PATENT DOCUMENTS

| 7,686,121 | B2 * | 3/2010 | Takeshima | ................ | B62K 5/01 180/291 |
| 2018/0065464 | A1 * | 3/2018 | Palhegyi. | ................. | B60G 7/02 |

FOREIGN PATENT DOCUMENTS

| CA | 2598773 | C | * | 8/2010 | ............... | B62K 5/01 |
| DE | 102017103678 | A1 | * | 9/2017 | .............. | B62J 35/00 |

* cited by examiner

*Primary Examiner* — Kevin Hurley
(74) *Attorney, Agent, or Firm* — Leong C. Lei (57) ABSTRACT

A fuel tank structure of an all-terrain vehicle is provided. The all-terrain vehicle includes a vehicle frame unit, a fuel tank arranged on the vehicle frame unit, a seat cushion arranged on the vehicle frame unit, a pair of rear wheels rotatably mounted to a rear section of the vehicle frame unit, and a power unit arranged on the vehicle frame unit. The power unit is connected to an exhaust unit. The vehicle frame unit includes a rear carrier rack and a rear ancillary tube assembly. The fuel tank is arranged rearwardly of the power unit and located below the rear carrier rack. The fuel tank includes a body portion, which is formed with a lower buffering fuel accommodation extension section extending in a direction toward a lower side of the vehicle body, so as to increase the weight of the fuel tank.

17 Claims, 9 Drawing Sheets

FUEL TANK STRUCTURE OF ALL-TERRAIN VEHICLE

TECHNICAL FIELD OF THE INVENTION

The present invention relates to a fuel tank structure of an all-terrain vehicle, and more particularly to a fuel tank structure of an all-terrain vehicle that enables increase of the weight of the fuel tank in order to adjust the disposition of the overall center of gravity of the all-terrain vehicle to thereby improve operation controllability of the all-terrain vehicle.

DESCRIPTION OF THE PRIOR ART

A known all-terrain vehicle has a fuel tank that is disposed at a front side of a driver seat and is located above an engine of a power unit. When the fuel tank contains fuel therein, the fuel tank demonstrates a weight. However, the known way of disposition of the fuel tank raises the center of gravity of the all-terrain vehicle and this affects the operation controllability of the all-terrain vehicle. Further, the fuel tank is arranged at above the engine of the power unit, and consequently, the fuel tank is susceptible to driving risk as being readily affected by a high temperature of the engine.

Figure 1:
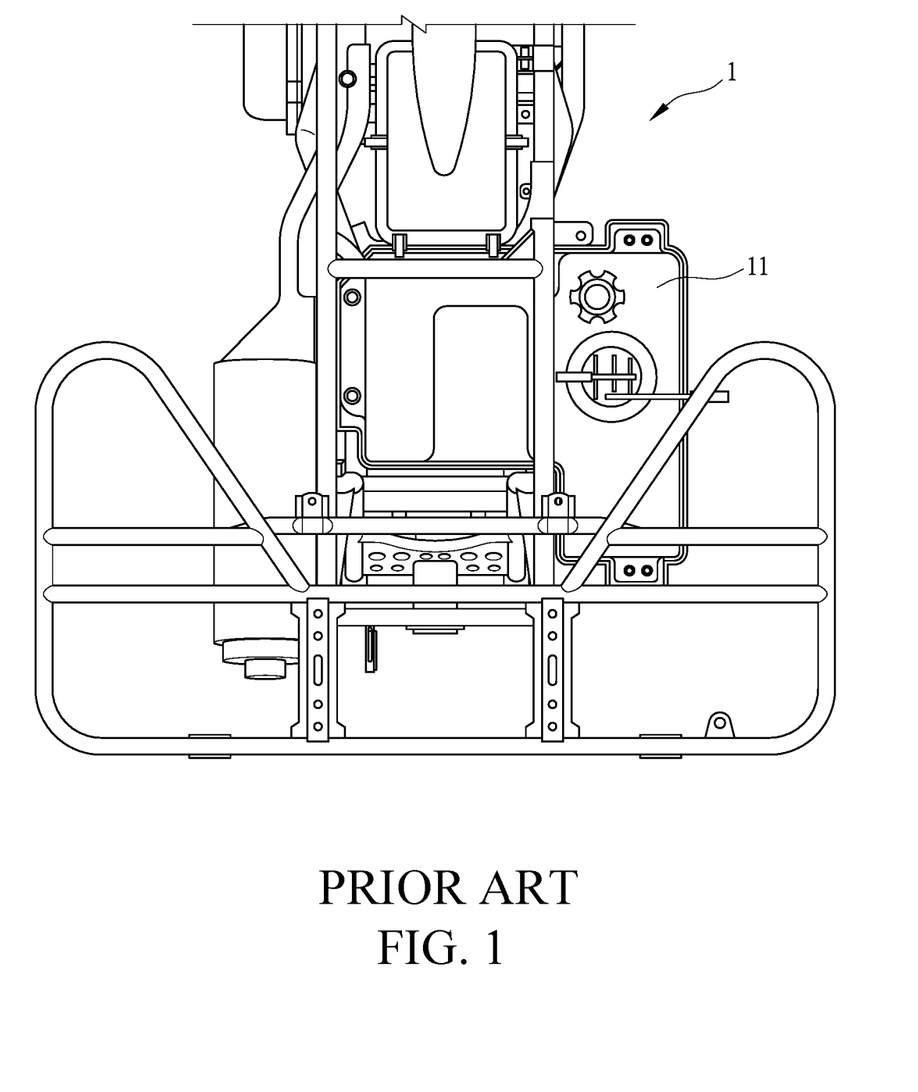
FIG. 1 shows Taiwan Patent TW201733828 A.

As shown in FIG. 1, Taiwan Patent TW201733828 A that is owned by the present applicant discloses a fuel tank 11 of an all-terrain vehicle 1 is disposed at a rear side of a vehicle body in order to avoid the influence of the fuel tank 11 by the high temperature of the engine. Also, by arranging the fuel tank 11 at the rear side of the vehicle body, the center of gravity of the vehicle body can be locally adjusted. However, the present applicant is not fully satisfied with such a solution and has been seeking for better improvement of the structure of the fuel tank 1 of the all-terrain vehicle 1.

Thus, it is a challenging issue for all-terrain vehicle manufacturers to provide a fuel tank structure for all-terrain vehicles that helps improves operation performance of the all-terrain vehicle fuel tank.

SUMMARY OF THE INVENTION

The primary objective of the present invention is to provide a fuel tank structure of an all-terrain vehicle, generally for the purposes of overcoming the drawback that the known fuel tank of all-terrain vehicles does not allow for increase of weight thereof to adjust the center of gravity of the entire vehicle body in order to improve operation controllability of the all-terrain vehicle.

For the purpose, a technical solution of the present invention as provided in claim 1 is to provide a fuel tank structure of an all-terrain vehicle, wherein the all-terrain vehicle at least comprises a vehicle frame unit, a fuel tank arranged on the vehicle frame unit, a seat cushion arranged on the vehicle frame unit, a pair of rear wheels rotatably mounted to a rear section of the vehicle frame unit, and a power unit arranged on the vehicle frame unit. The power unit is connected to an exhaust unit. The vehicle frame unit at least comprises a rear carrier rack and a rear ancillary tube assembly. The fuel tank is arranged rearwardly of the power unit and located below the rear carrier rack. The fuel tank comprises a body portion. The body portion is formed with a lower buffering fuel accommodation extension section extending in a direction toward a lower side of the vehicle body. The lower buffering fuel accommodation extension section has a bottom that is adjacent to the rear ancillary tube assembly.

A technical solution of the present invention as provided in claim 2 is that the all-terrain vehicle at least comprises a vehicle frame unit, a fuel tank arranged on the vehicle frame unit, a seat cushion arranged on the vehicle frame unit, a pair of rear wheels rotatably mounted to a rear section of the vehicle frame unit, and a power unit arranged on the vehicle frame unit. The power unit is connected to an exhaust unit. The vehicle frame unit at least comprises a rear carrier rack and a rear ancillary tube assembly. The fuel tank is arranged rearwardly of the power unit and located below the rear carrier rack. The fuel tank comprises a body portion. The body portion is formed with a rear fuel accommodation extension section extending in a direction toward a rear side of the vehicle body. The rear fuel accommodation extension section comprises a left-side rear fuel accommodation extension section, a right-side rear fuel accommodation extension section, and an accommodation recess between the left-side rear fuel accommodation extension section and the right-side rear fuel accommodation extension section. The accommodation recess receives a portion of tubes of the rear ancillary tube assembly to accommodate therein.

A technical solution of the present invention as provided in claim 3 is that the all-terrain vehicle at least comprises a vehicle frame unit, a fuel tank arranged on the vehicle frame unit, a seat cushion arranged on the vehicle frame unit, a pair of rear wheels rotatably mounted to a rear section of the vehicle frame unit, and a power unit arranged on the vehicle frame unit. The power unit is connected to an exhaust unit. The vehicle frame unit at least comprises a rear carrier rack and a rear ancillary tube assembly. The fuel tank is arranged rearwardly of the power unit and located below the rear carrier rack. The fuel tank comprises a body portion. The body portion is formed with a lateral fuel accommodation extension section extending in a vehicle body width direction. The lateral fuel accommodation extension section has at least a portion above the rear wheels.

A technical solution of the present invention as provided in claim 4 is that the fuel tank has a side that is provided with a positioning pillar. The positioning pillar extends through a thermal insulation member and penetrates into a fuel tank positioning section of the vehicle frame unit. The fuel tank is provided with a protection cover that is arranged at one side that is opposite to the positioning pillar to cover an outside thereof.

A technical solution of the present invention as provided in claim 5 is that a cushioning member is arranged between a bottom of the lower buffering fuel accommodation extension section of the fuel tank and a cross tube of the rear ancillary tube assembly.

A technical solution of the present invention as provided in claim 6 is that a portion of the bottom of the lower buffering fuel accommodation extension section of the fuel tank that is close to a center is a lowest point of the fuel tank toward a lower side of the vehicle body.

A technical solution of the present invention as provided in claim 7 is that the body portion is provided with a fuel pump assembly, and the fuel pump assembly comprises a fuel drawing opening and a fuel conveyance port. The fuel drawing opening is located in the fuel tank at a lowest position. The fuel conveyance port is connected to a fuel conveyance pipe.

A technical solution of the present invention as provided in claim 8 is that the lower buffering fuel accommodation extension section is formed by having the body portion extended in the vehicle body width direction as sloping downward and from outside to inside in two sides. A part of the lower buffering fuel accommodation extension section that is close to a center is spaced from the upper end face of the body portion by a distance that is greater than a distance by which two side portions of the lower buffering fuel accommodation extension section are spaced from the upper end face of the body portion. A length of the lower buffering fuel accommodation extension section extending in the vehicle body width direction is greater than a width thereof extending in a front-rear direction of the vehicle body.

A technical solution of the present invention as provided in claim 9 is that the lateral fuel accommodation extension section has an upper end face that is provided with a fuel filling opening. The fuel filling opening is covered with a fuel filling opening cap. The upper end face of the lateral fuel accommodation extension section is raised more toward an upper side in an up-down direction of the vehicle body than an upper end face of the body portion. The lateral fuel accommodation extension section has a bottom face that is inclined. The fuel filling opening is arranged at a side that is opposite to a muffler of the exhaust unit in the vehicle body width direction.

A technical solution of the present invention as provided in claim 10 is that the right-side rear fuel accommodation extension section has an upper end face that is raised more toward an upper side of an up-down direction of the vehicle body that an upper end face of the body portion and an upper end face the left-side rear fuel accommodation extension section. The upper end face of the right-side rear fuel accommodation extension section is provided with a ventilation device that is in communication with the right-side rear fuel accommodation extension section.

A technical solution of the present invention as provided in claim 11 is that the accommodation recess receives an upright tube of the right-side rear ancillary tube of the rear ancillary tube assembly of the vehicle frame unit.

A technical solution of the present invention as provided in claim 12 is that the lower buffering fuel accommodation extension section has a bottom that is adjacent to a cross tube of the right-side rear ancillary tube of the rear ancillary tube assembly.

An efficacy that the technical solution of claim 1 may achieve is that the lower buffering fuel accommodation extension section is prevented from being damaged by collision of violet vibration of fuel; the fuel tank is provided, on the lower part of the body portion, with the lower buffering fuel accommodation extension section to increase the fuel storage capacity of the fuel tank, whereby the weight of the fuel tank can be increased and the weight of the fuel tan can be used to adjust the distribution of the overall center of gravity of the all-terrain vehicle to improve operation controllability of the all-terrain vehicle.

An efficacy that the technical solution of claim 2 may achieve is that the weight of the fuel tank can be increased and the weight of the fuel tan can be used to adjust the distribution of the overall center of gravity of the all-terrain vehicle to improve operation controllability of the all-terrain vehicle.

An efficacy that the technical solution of claim 3 may achieve is that the weight of the fuel tank can be increased and the weight of the fuel tan can be used to adjust the distribution of the overall center of gravity of the all-terrain vehicle to improve operation controllability of the all-terrain vehicle.

An efficacy that the technical solution of claim 4 may achieve is that, on the one hand, an effect of positioning the left side of the fuel tank is achieved, and on the other hand, isolation provided by the thermal insulation member prevents the left side of the fuel tank from being affected by a high temperature of the muffler of the exhaust unit and an effect of protecting the outside of the right half of the fuel tank is provided.

An efficacy that the technical solution of claim 5 may achieve is that collision and abrasion between the bottom of the lower buffering fuel accommodation extension section and the cross tube of the rear ancillary tube assembly can be prevented and an effect of shock absorption for the fuel tank can also be improved.

An efficacy that the technical solution of claim 6 may achieve is that, on the one hand, the fuel storage capacity of the fuel tank can be increased, and on the other hand, stability of the liquid surface of the fuel stored in the fuel tank can be stabilized.

An efficacy that the technical solution of claim 7 may achieve is that the effect of supplying fuel from the fuel tank can be improved.

An efficacy that the technical solution of claim 8 may achieve is that the stiffness and strength of the fuel tank can be improved and the weight of the fuel tank can be increased and the weight of the fuel tank can be used to adjust the distribution of the overall center of gravity of the all-terrain vehicle to improve operation controllability of the all-terrain vehicle.

An efficacy that the technical solution of claim 9 may achieve is that the stiffness and strength of the fuel tank can be improved and safety of fueling in the fuel tank can be improved.

An efficacy that the technical solution of claim 10 may achieve is that the stiffness and strength of the fuel tank and the smoothness of supplying of fuel can be improved and the weight of the fuel tank can be increased and the weight of the fuel tank can be used to adjust the distribution of the overall center of gravity of the all-terrain vehicle to improve operation controllability of the all-terrain vehicle.

An efficacy that the technical solution of claim 11 may achieve is that assembling of the fuel tank is made easy.

An efficacy that the technical solution of claim 12 may achieve is that assembling of the fuel tank is made easy.

DETAILED DESCRIPTION OF THE PREFERRED EMBODIMENT

For better understanding of the structure, as well as the effectiveness that may be achieved, according to the present invention, a description will be provided below with reference to the attached drawings.

Figure 2:
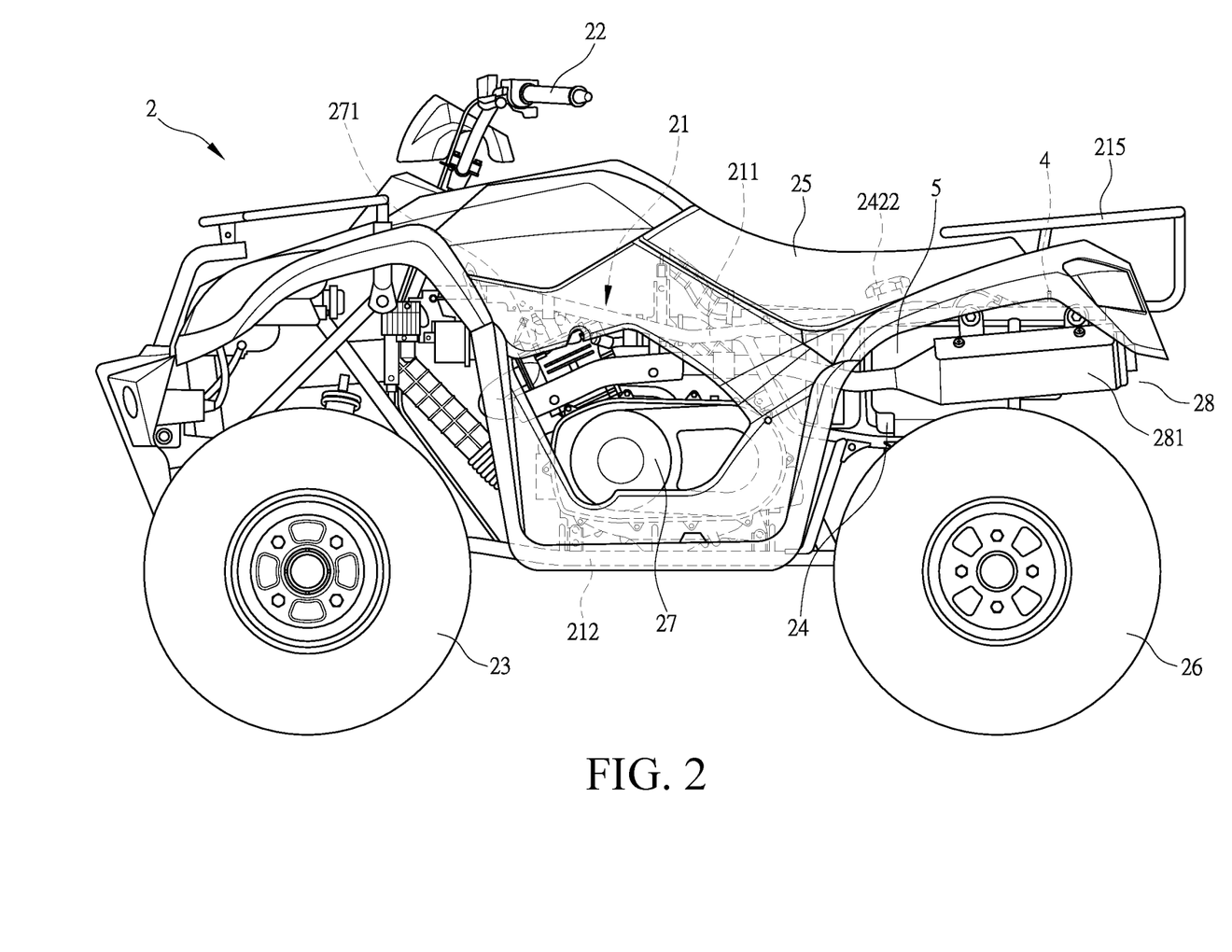
FIG. 2 is a side elevational view showing an all-terrain vehicle according to the present invention.
Figure 3:
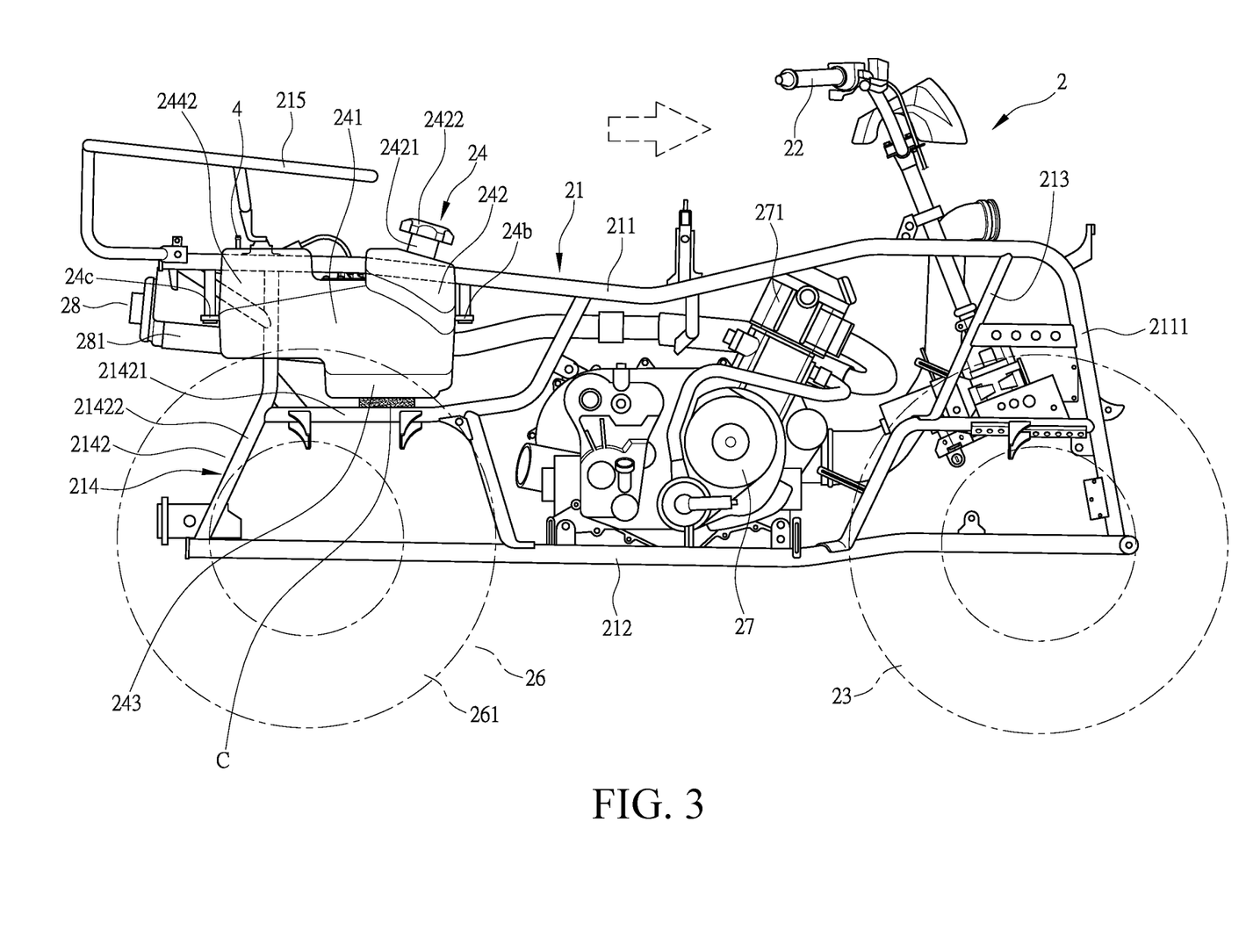
FIG. 3 is a schematic view illustrates an arrangement of a fuel tank of the all-terrain vehicle according to the present invention.

Firstly, referring to FIGS. 2 and 3, the present invention provides a fuel tank structure of an all-terrain vehicle. The all-terrain vehicle 2 comprises a vehicle frame unit 21, a steering mechanism 22 that is rotatably mounted to a front section of the vehicle frame unit 21, a pair of front wheels 23 that are rotatably mounted to a lower side of the front section of the vehicle frame unit 21 in a manner of being respectively arranged at left and right sides and are controllable by the steering mechanism 22, a fuel tank 24 that is arranged at a rear section of the vehicle frame unit 21 to receive and hold therein fuel, a seat cushion 25 that is arranged on an upper side of the rear section of the vehicle frame unit 21, a pair of rear wheels 26 that are rotatably mounted to a lower side of the rear section of the vehicle frame unit 21 in a manner of being respectively arranged at left and right sides, and a power unit 27 arranged on the vehicle frame unit 21.

As shown in FIG. 3, the vehicle frame unit 21 at least comprises a pair of upper tubes 211, which are respectively at left and right sides, and a pair of lower tubes 212 that are arranged below the upper tubes 211 in a corresponding manner, wherein the upper tubes 211 comprise down tube sections 2111 arranged in a vehicle head direction (an arrow being included in the drawing to indicate the vehicle head direction). The down tube sections 2111 have lower ends connected to the lower tubes 212. Further, connected between front parts of the upper tubes 211 and the lower tubes 212 (toward the vehicle head direction) and arranged at two sides are front ancillary tube assemblies 213, the front ancillary tube assemblies 213 being provided in pair to be respectively at left and right sides. The front ancillary tube assemblies 213 are respectively connected to the down tube sections 2111, the lower tubes 212, and the upper tubes 211. The vehicle frame unit 21 is provided, at a rear end (vehicle tail) thereof, with rear ancillary tube assemblies 214 arranged between the upper tubes 211 and the lower tubes 212 and located at the two sides. The rear ancillary tube assemblies 214 are arranged in pair to be respectively at left and right sides (wherein the side of the left hand of a rider riding the vehicle is taken as the left side and that of the right hand is the right side, this being applied to the description hereinafter) as a left-side rear ancillary tube 2141 and a right-side rear ancillary tube 2142. The rear ancillary tube assemblies 214 are respectively connected to the upper tubes 211 and the lower tubes 212. The vehicle frame unit 21 is provided, at the rear end (vehicle tail) thereof, with a rear carrier rack 215 located above the upper tubes 211.

As shown in FIGS. 2 and 3, the vehicle frame unit 21 is provided, in a rotatable manner at the front side thereof, with the steering mechanism 22. A group of front wheels 23 is arranged below the steering mechanism 22 and the front wheels 23 are driven by the steering mechanism 22 to carry out operations of left turning and right turning. The vehicle frame unit 21 is provided with the seat cushion 25 that is arranged at a location above the upper tubes 211 and toward a rear side of the vehicle body to receive the rider to sit thereon. The seat cushion 25 is liftable from the vehicle frame unit 21. The vehicle frame unit 21 is provided with the power unit 27 that is arranged between the upper tubes 211 and the lower tubes 212, and more specifically, the power unit 27 is located below the seat cushion 25. The vehicle frame unit 21 is coupled, at a rear side thereof, to a group of rear wheels 26 that are drivable by the power unit 27.

As shown in FIGS. 2 and 3, the power unit 27 is arranged below the seat cushion 25 and is suspended on the vehicle frame unit 21. The power unit 27 comprises a cylinder head 271, and the cylinder head 271 is connected, at a rear side thereof, to an exhaust unit 28. The exhaust unit 28 is located at the left side of the all-terrain vehicle 2 (the left side being the side of the left hand of the rider in riding the vehicle). The exhaust unit 28 functions to discharge waste gas generated by explosion of fuel combustion inside the power unit 27.

Figure 4:
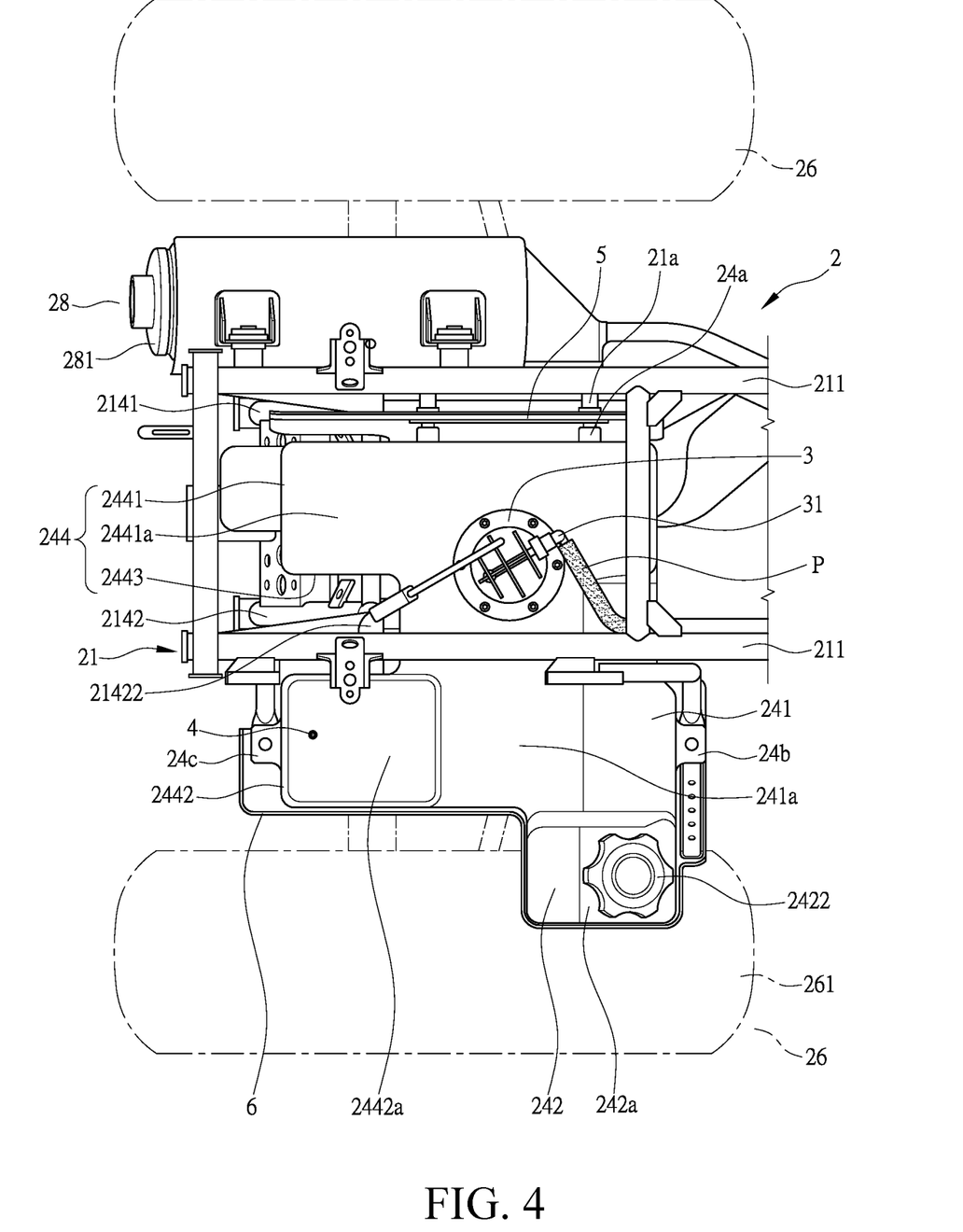
FIG. 4 is a top plan view showing the arrangement of the fuel tank of the all-terrain vehicle according to the present invention.
Figure 5:
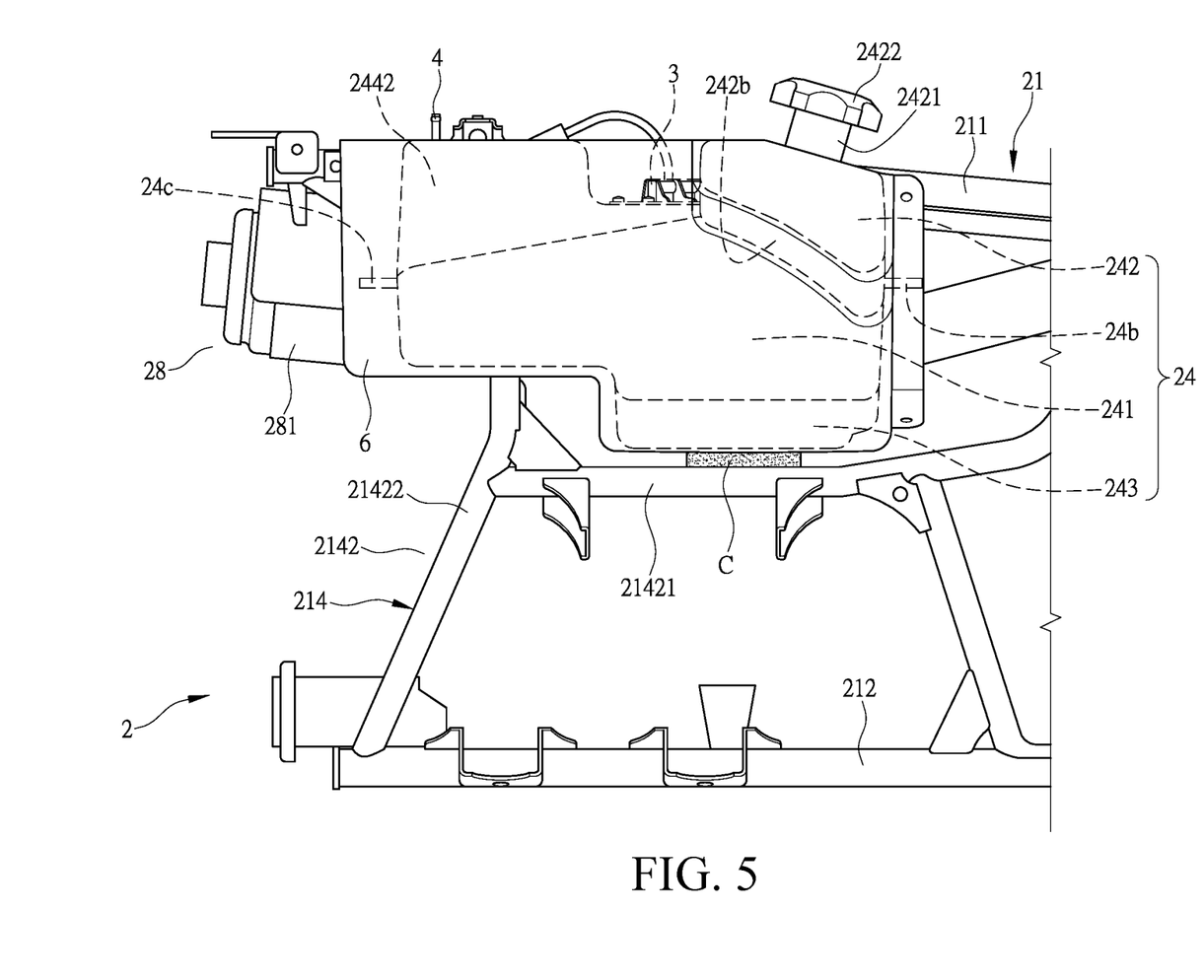
FIG. 5 is a side elevational view showing the arrangement of the fuel tank of the all-terrain vehicle according to the present invention.

As shown in FIGS. 3, 4, and 5, the vehicle frame unit 21 is provided with a fuel tank 24 at a location between the upper tubes 211 and the lower tubes 212 and toward the rear side of the vehicle body, and more specifically, the fuel tank 24 is arranged rearward of or behind the power unit 27 and is located below or on the underside of the rear carrier rack, so that the fuel tank 24 is kept away from the cylinder head 271 of the power unit 27 in order to prevent a high temperature generated by the cylinder head 271 of the power unit 27 from affecting the fuel tank 24. The fuel tank 24 generally functions for holding and storing fuel that is supplied for combustion and explosion inside the power unit 27. In an operation of the all-terrain vehicle 2, fresh external air is filtered by an intake filter unit and the external fresh air so filtered is mixed with the fuel supplied from the fuel tank 24 as a fuel-air mixture, which is combusted and exploded inside the power unit 27 to generate mechanical power by which the power unit 27 drives the rear wheels 26 to rotate and the rear wheels 26 then drive the front wheels 23 to rotate simultaneously therewith to achieve the purpose of advancing.

As shown in FIGS. 4, 5, 6, 7, 8, and 9, the fuel tank 24 comprises a body portion 241. The body portion 241 has an upper end face 241a that is mounted with a fuel pump assembly 3 that extends in to the body portion 241. The fuel pump assembly 3 comprises a fuel drawing opening (not shown in the drawings) that is arranged in the body portion 241 and a fuel conveyance port 31. The fuel pump assembly 3 draws the fuel stored in the fuel tank 24 through the fuel drawing opening for being conveyed, by way of the fuel conveyance port 31, through a fuel conveyance pipe P to the power unit 27 for combustion and explosion. The body portion 241 of the fuel tank 24 is formed, through being extended in the vehicle body width direction, with a lateral fuel accommodation extension section 242 that is connected to and in communication with the body portion 241. The lateral fuel accommodation extension section 242 has an upper end face 242a that is provided with a fuel filling opening 2421 and a fuel filling opening cap 2422. With the fuel tank 24 mounted on the vehicle frame unit 21, as viewed in direction from the rear side of the vehicle body toward the front side of the vehicle body, the lateral fuel accommodation extension section 242 has at least a portion located above a right-side rear wheel 261 of the rear wheels 26. The upper end face 242a of the lateral fuel accommodation extension section 242 is arranged to projects more toward an upper side in an up-down direction of the vehicle body than the upper end face 241a of the body portion 241 is, so as to improve stiffness and strength of the fuel tank 24. The lateral fuel accommodation extension section 242 has a bottom face 242b that is an inclined surface, and mores specifically, the bottom face 242b of the lateral fuel accommodation extension section 242 is arranged to incline downward in a direction from outside toward the body portion 241. By having the body portion 241 of the fuel tank 24 formed with the lateral fuel accommodation extension section 242 that extends in a vehicle body width direction, on the one hand, overall effective fuel storage of the fuel tank 24 is increased to thereby increase the weight of the fuel tank 24 for adjusting distribution of an overall center of gravity of the all-terrain vehicle 2 by means of the weight of the fuel tank 24 and thus improve operation controllability of the all-terrain vehicle 2, and on the other hand, the fuel filling opening 2421 and the fuel filling opening cap 2422 are provided on the upper end face 242*a* of the lateral fuel accommodation extension section 242 so that the fuel filling opening 2421 of the fuel tank 24 is arranged at the side that is opposite to a muffler 281 of the exhaust unit 28, and more specifically, the fuel filling opening 2421 of the fuel tank 24 is kept away from the muffler 281 of the exhaust unit 28 to thereby improve security and safety of fueling of the fuel tank 24.

Figure 6:
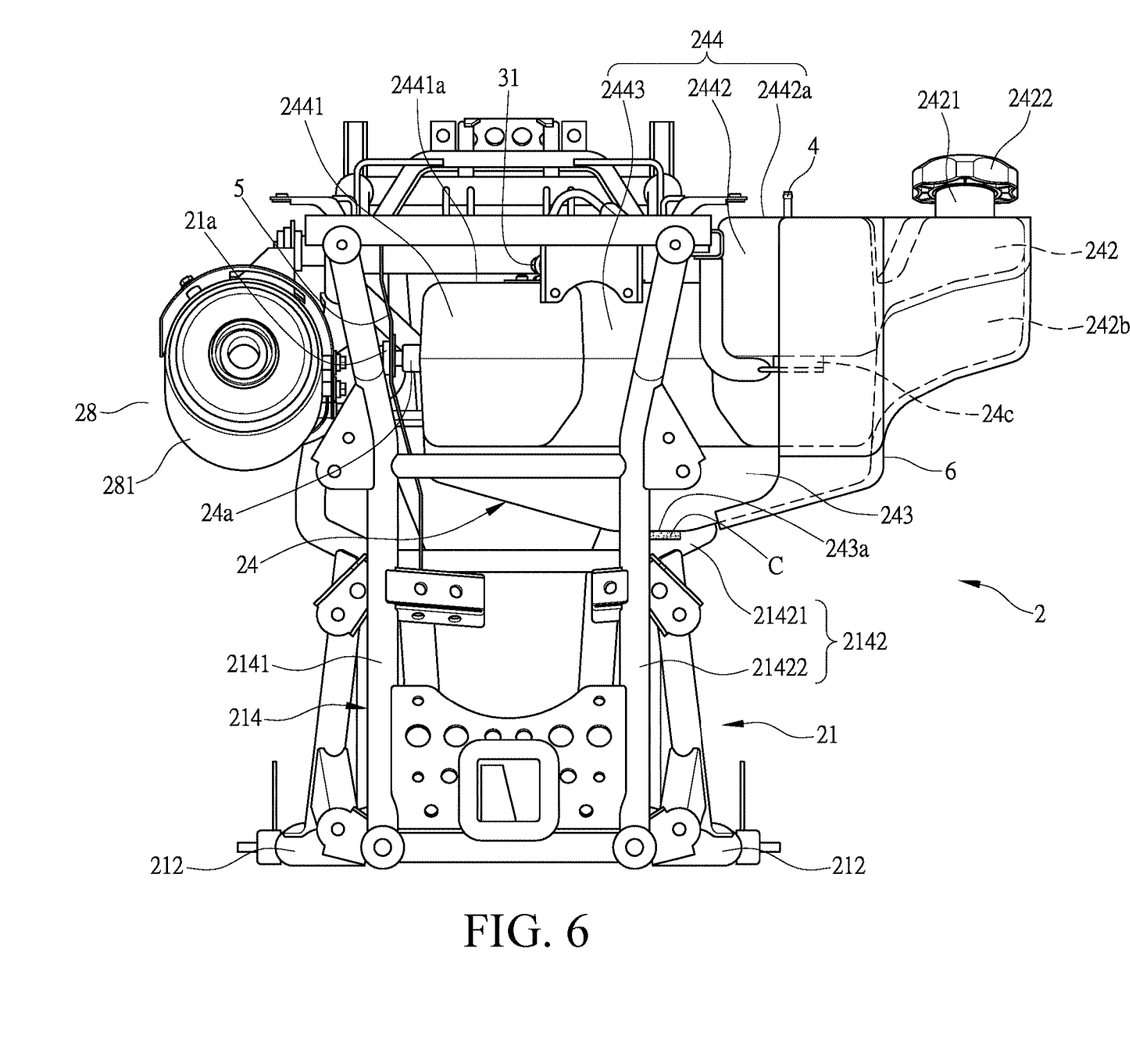
FIG. 6 is a rear view showing the arrangement of the fuel tank of the all-terrain vehicle according to the present invention.
Figure 7:
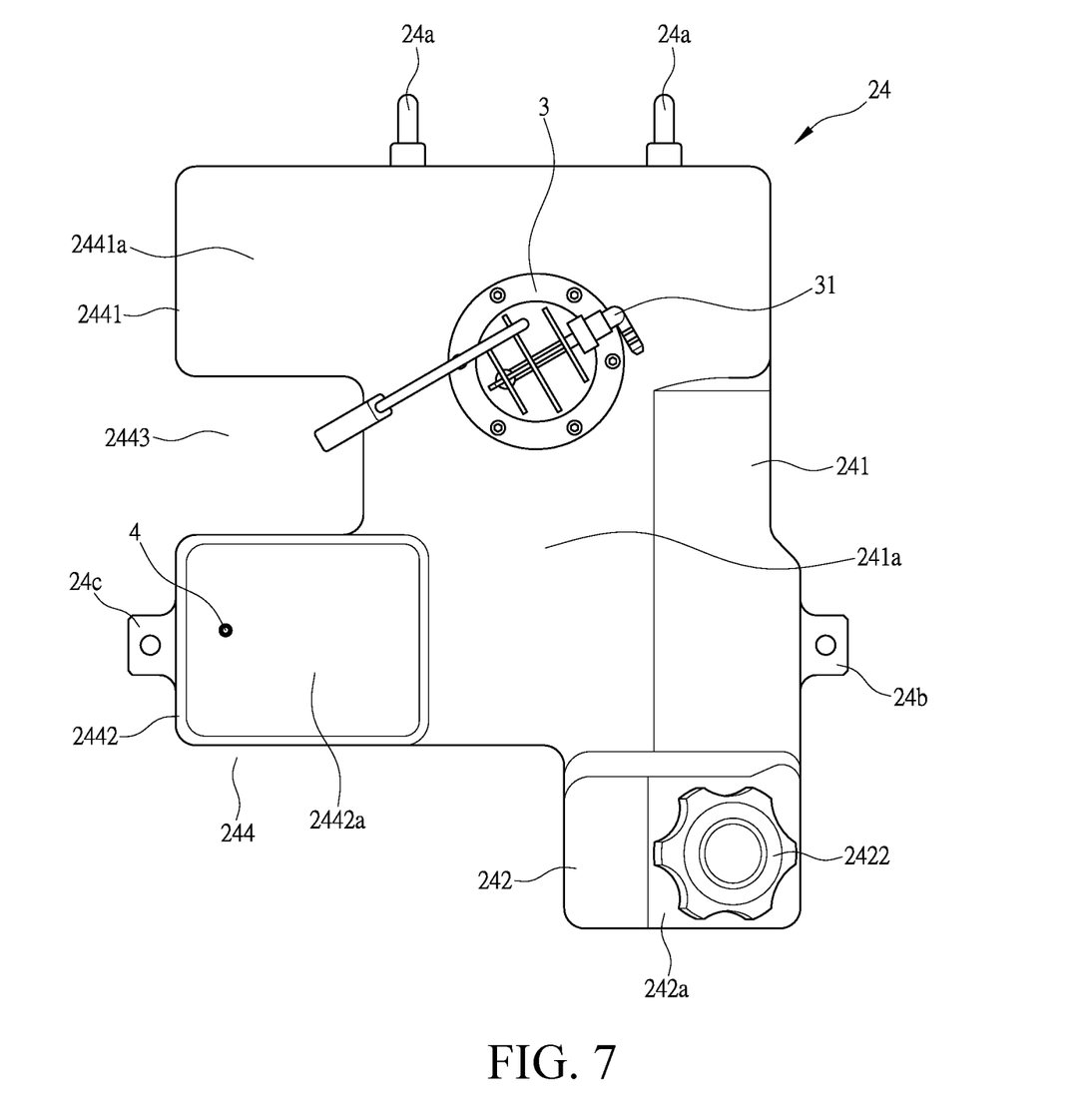
FIG. 7 is a top plan view showing the fuel tank of the all-terrain vehicle according to the present invention.
Figure 8:
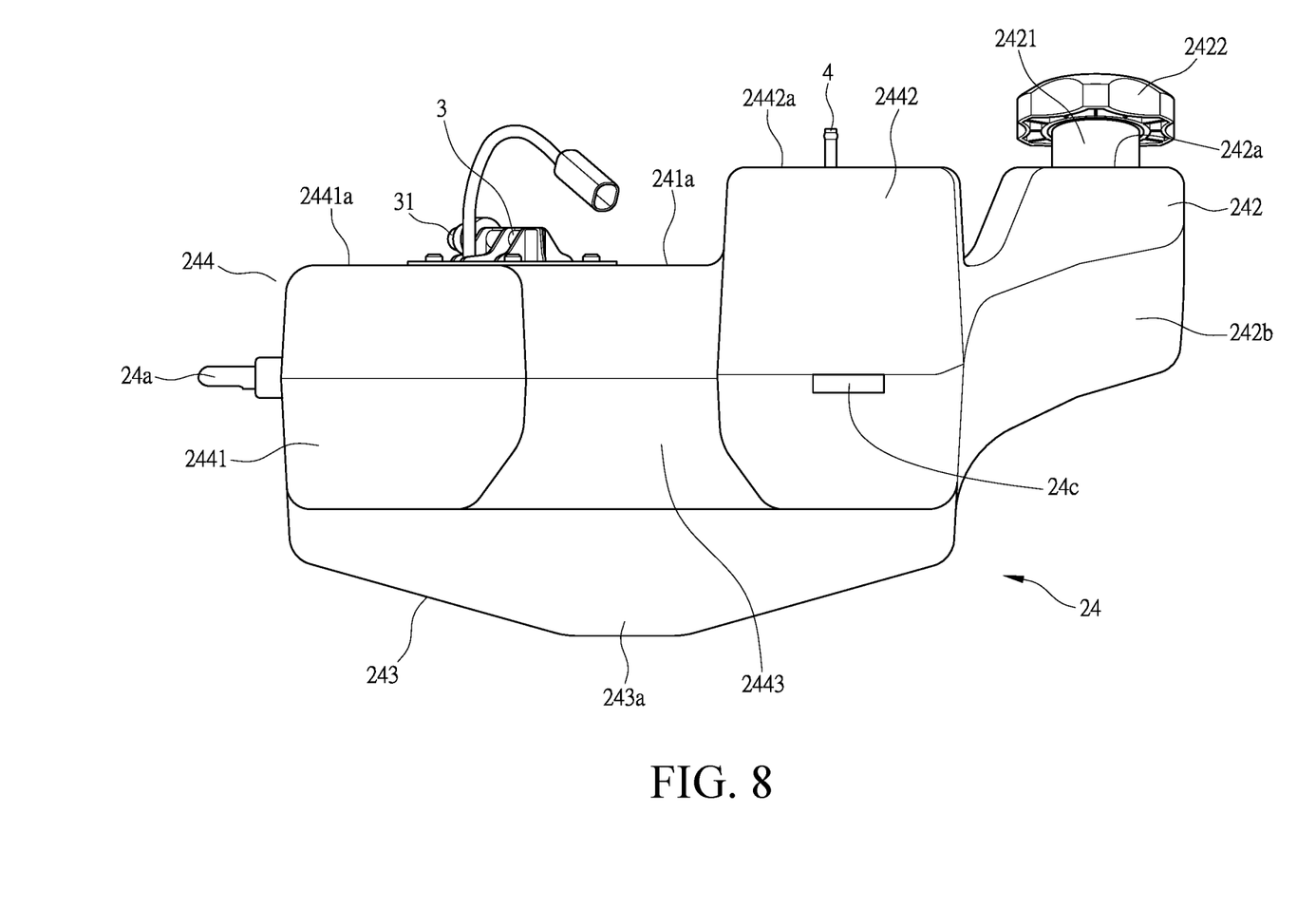
FIG. 8 is a rear view showing the fuel tank of the all-terrain vehicle according to the present invention.
Figure 9:
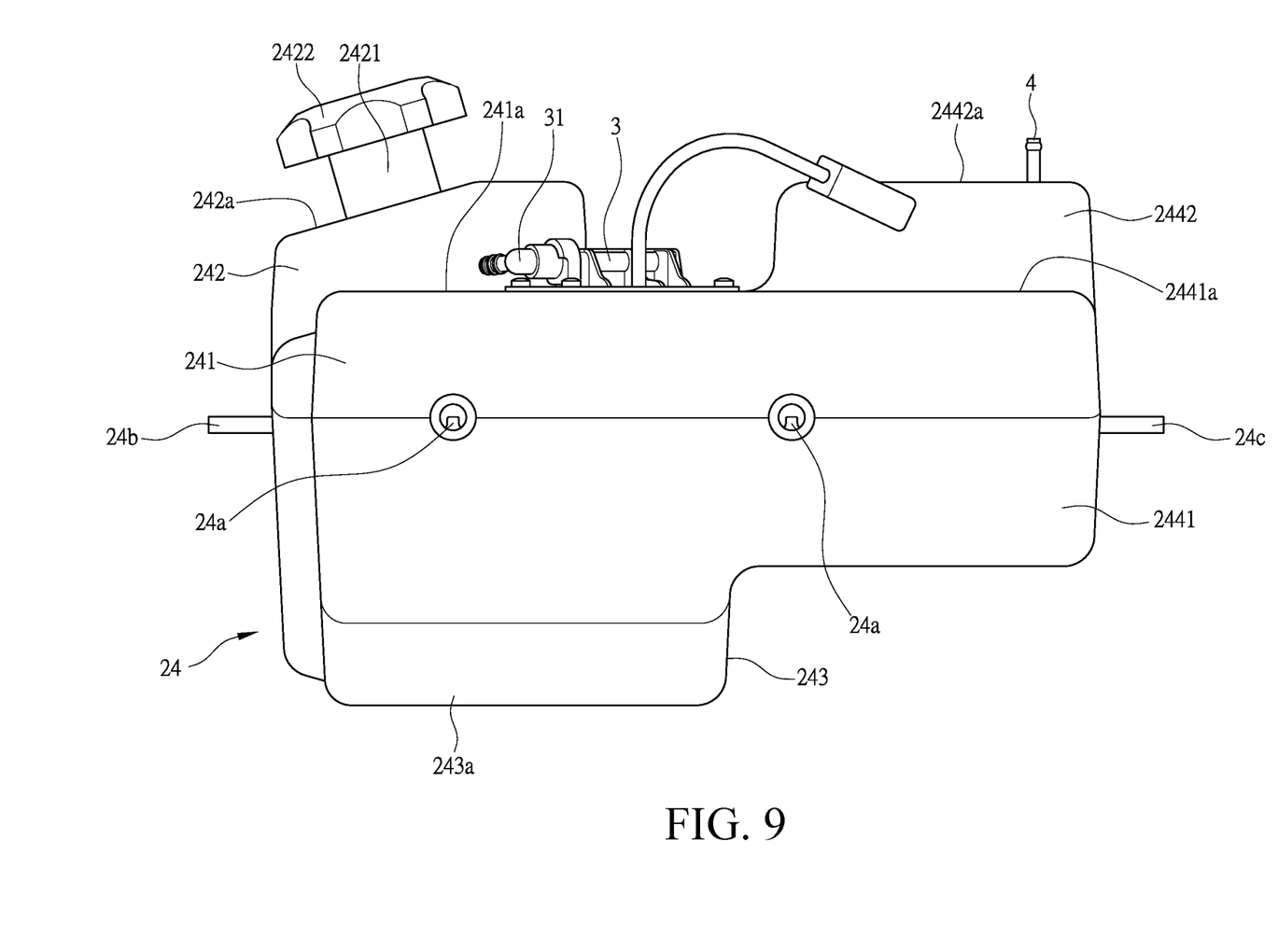
FIG. 9 is a left side view showing the fuel tank of the all-terrain vehicle according to the present invention.

As shown in FIGS. 6, 8, and 9, the fuel tank 24 is formed, as being extended in a manner of sloping and gradually tapering, with a lower buffering fuel accommodation extension section 243 on a lower side of the body portion 241 and facing toward a lower side of the vehicle body. More specifically, the lower buffering fuel accommodation extension section 243 is formed by having the body portion 241 extending in the vehicle body width direction toward the lower side of the vehicle body and inclining from outside to inside at each of two opposite sides, so that a central portion of the lower buffering fuel accommodation extension section 243 is spaced from the upper end face 241*a* of the body portion 241 by a distance that is larger than distances that two side portions of the lower buffering fuel accommodation extension section 243 are spaced from the upper end face 241*a* of the body portion 241. Further, a length of the lower buffering fuel accommodation extension section 243 in the vehicle body width direction is greater than a width thereof in a front-rear direction of the vehicle body, so that a portion of the bottom 243*a* of the lower buffering fuel accommodation extension section 243 that is at or close to a center thereof is a lowest point of the fuel tank 24, and thus, the portion of the bottom 243*a* of the lower buffering fuel accommodation extension section 243 that is at or close to the center thereof is adjacent to a cross tube 21421 of the right-side rear ancillary tube 2142 of the rear ancillary tube assemblies 214. A cushioning member C is arranged between the cross tube 21421 of the right-side rear ancillary tube 2142 of the rear ancillary tube assemblies 214 and the bottom 243*a* of the bottom 243*a* of the lower buffering fuel accommodation extension section 243 in order to prevent collision and abrasion between the bottom 243*a* of the lower buffering fuel accommodation extension section 243 and the cross tube 21421 of the right-side rear ancillary tube 2142 of the rear ancillary tube assemblies 214, and thus improving an effect of shock absorption for the fuel tank 24. Further, the fuel drawing opening (not shown in the drawings) of the fuel pump assembly 3 can be arranged at a location at or close to a center of the lower buffering fuel accommodation extension section 243 for improving an effect of pumping of fuel provided by the fuel pump assembly 3. By structuring the fuel tank 24 in such a way of being extended from a lower part of the body portion 241 to form the lower buffering fuel accommodation extension section 243 and the lower buffering fuel accommodation extension section 243 being arranged in a sloping and tapering configuration, when the all-terrain vehicle 2 moves on a bad terrain or making a large angle turn that causes severe vibration and shocking of the vehicle body, the fuel contained in the fuel tank 24 is also caused to vibrate inside the fuel tank 24 and the fuel collides and impacts on walls of the fuel tank 24. Due to the lower buffering fuel accommodation extension section 243 being connected to and in communication with the body portion 241 and the body portion 241 being connected to and in communication with the lateral fuel accommodation extension section 242, the violently vibrating fuel is allowed to overflow into the body portion 241 and then partly flowing into the lateral fuel accommodation extension section 242 to thereby prevent the lower buffering fuel accommodation extension section 243 from being damaged by violent impact and collision by the fuel. By providing the lower buffering fuel accommodation extension section 243 on the lower part of the body portion 241 of the fuel tank 24, the capacity of the fuel tank 24 for holding fuel therein can be increased and thus, the weight of the fuel tank 24 can be used to adjust the overall center of gravity of the all-terrain vehicle 2 to thereby improve operation controllability of the all-terrain vehicle 2.

As shown in FIGS. 4, 6, 7, 8, and 9, the fuel tank 24 is formed with a rear fuel accommodation extension section 244 that is extended from the body portion 241 toward a rear side of the front-rear direction (the rear side of the vehicle body). The rear fuel accommodation extension section 244 comprises a left-side rear fuel accommodation extension section 2441, a right-side rear fuel accommodation extension section 2442, and an accommodation recess 2443 located between the left-side rear fuel accommodation extension section 2441 and the right-side rear fuel accommodation extension section 2442. The left-side rear fuel accommodation extension section 2441 and the right-side rear fuel accommodation extension section 2442 are connected to and in communication with the body portion 241. The accommodation recess 2443 is provided for accommodating an upright tube 21422 of the right-side rear ancillary tube 2142 of the rear ancillary tube assemblies 214 of the vehicle frame unit 21. The right-side rear fuel accommodation extension section 2442 has an upper end face 2442*a* that is raised toward an upper side of the up-down direction of the vehicle body by an amount larger than those of the upper end face 241*a* of the body portion 241 and the upper end face 2441*a* of the left-side rear fuel accommodation extension section 2441, so that a fuel storage capacity of the right-side rear fuel accommodation extension section 2442 is made larger than that of the left-side rear fuel accommodation extension section 2441, and thus, the stiffness and strength of the fuel tank 24 can be improved. By arranging the left-side rear fuel accommodation extension section 2441 and the right-side rear fuel accommodation extension section 2442 of the rear fuel accommodation extension section 244 to increase the fuel storage capacity of the fuel tank 24, the weight of the fuel tank 24 can be increased and thus, the weight of the fuel tank 24 can be used to adjust the overall center of gravity of the all-terrain vehicle 2 to thereby improve operation controllability of the all-terrain vehicle 2. The upper end face 2442*a* of the right-side rear fuel accommodation extension section 2442 is provided with a ventilation device 4 that is in communication with the right-side rear fuel accommodation extension section 2442. The ventilation device 4 provides communication of the fuel tank 24 with surrounding atmosphere so as to allow the fuel pump assembly 3 to smoothly pump fuel out of the fuel tank 24, thereby improving smoothness of output of fuel from the fuel tank 24. With the arrangement of the accommodation recess 2443 of the rear fuel accommodation extension section 244 to accommodate the right-side rear ancillary tube 2142 of the rear ancillary tube assembly 214 of the vehicle frame unit 21, installation of the fuel tank 24 is made easy.

As shown in FIGS. 4, 6, 7, 8, and 9, the fuel tank 24 is provided, at one side thereof (left side) with a pair of positioning pillars 24*a* projecting therefrom and a front mounting lug 24b arranged at a front side thereof and a rear mounting lug 24c arranged at a rear side thereof. The positioning pillars 24a are arranged to extend from one side (the left side) of the body portion 241 toward the exhaust unit 28. The positioning pillars 24a extend through a thermal insulation member 5 and penetrate into fuel tank positioning sections 21a extending from the vehicle frame unit 21. With such an arrangement, on the one hand, an effect of positioning is achieved for the left side of the fuel tank 24, and on the other hand, isolation achieved with the thermal insulation member 5 allows the left side of the fuel tank 24 to be not affected by a high temperature of the muffler 281 of the exhaust unit 28. The front mounting lug 24b projects out from the front end of the body portion 241, and the rear mounting lug 24c projects out from the right-side rear fuel accommodation extension section 2442 of the rear fuel accommodation extension section 244. The arrangement of the front mounting lug 24b and the rear mounting lug 24c allows the front and rear sides of the fuel tank 24 to be securely fixed to the vehicle frame unit 21, so as to provide a bettered effect of securing for the fuel tank 24. The fuel tank 24 is covered, on an outside thereof at the side (the right side) that is opposite to the positioning pillars 24a, with a protection cover 6. The protection cover 6 is arranged to cover, from a bottom of a right half of the fuel tank 24, the right end of the fuel tank 24, and more specifically, the protection cover 6 covers from the right half of the lower buffering fuel accommodation extension section 243 of the fuel tank 24 to the lateral fuel accommodation extension section 242 and also the outside of the right side of the right-side rear fuel accommodation extension section 2442 of the rear fuel accommodation extension section 244. The outside of the right half of the fuel tank 24 is covered by the protection cover 6 for protection against collision of pebbles or other foreign objects ejecting from the ground from hitting onto the lower buffering fuel accommodation extension section 243, the lateral fuel accommodation extension section 242, and the bottom and sides of the right-side rear fuel accommodation extension section 2442 of the rear fuel accommodation extension section 244 of the fuel tank 24.

As shown in FIGS. 3, 4, 5, and 6, the fuel tank 24 may use the accommodation recess 2443 of the rear fuel accommodation extension section 244 to align from the right side of the vehicle body with the upright tube 21422 of the right-side rear ancillary tube 2142 of the rear ancillary tube assembly 214, and then, the fuel tank 24 can be pushed in by having the accommodation recess 2443 of the rear fuel accommodation extension section 244 facing toward the left side of the vehicle body (the side that is provided with the exhaust unit 28), until the right-side rear ancillary tube 2142 of the rear ancillary tube assembly 214 reaches the bottom of the accommodation recess 2443 of the rear fuel accommodation extension section 244, and then, the fuel tank 24 is rotated, about a center defined by the right-side rear ancillary tube 2142 of the rear ancillary tube assembly 214, by an angle, in a more specific way, rotating the fuel tank 24 toward the left side of the vehicle body (the side that is provided with the exhaust unit 28) by 90 degrees, to have the positioning pillars 24a penetrate into the fuel tank positioning sections 21a extended from the vehicle frame unit 21, so that the left side of the fuel tank 24 is properly positioned first, and finally, the front mounting lug 24b and the rear mounting lug 24c of the fuel tank 24 are applied to have the front and rear sides of the fuel tank 24 securely fixed to the vehicle frame unit 21 thereby accomplishing positioning and installing of the fuel tank 24 and setting the fuel tank 24 at a rear side of the power unit 27 and below the seat cushion 25 and also keeping the fuel filling opening 2421 and the fuel pump assembly 3 of the fuel tank 24 away from the side where the exhaust unit 28 is arranged to ensure ingress and egress of fuel into and out of the fuel tank 24 are not affected by a high temperature generated by the exhaust unit 28 to thereby improving use safety of the fuel tank 24. Since the fuel tank 24 is provided with the lateral fuel accommodation extension section 242, the lower buffering fuel accommodation extension section 243, and the rear fuel accommodation extension section 244 extended therefrom to increase the fuel storage capacity of the fuel tank 24, the weight of the fuel tank 24 can be increased and the weight of the fuel tank 24 can be used to adjust the distribution of the overall center of gravity of the all-terrain vehicle 2 to improve operation controllability of the all-terrain vehicle 2.

The primary efficacy of the present invention is that the fuel tank 24 comprises a body portion 241, and the body portion 241 is provided, as being extended in direction toward a lower side of the vehicle body, with the lower buffering fuel accommodation extension section 243, and the bottom 243a of the lower buffering fuel accommodation extension section 243 is adjacent to the rear ancillary tube assembly 214, whereby the lower buffering fuel accommodation extension section 243 is prevented from being damaged by collision of violet vibration of fuel; the fuel tank 24 is provided, on the lower part of the body portion 241, with the lower buffering fuel accommodation extension section 243 to increase the fuel storage capacity of the fuel tank 24, whereby the weight of the fuel tank 24 can be increased and the weight of the fuel tank 24 can be used to adjust the distribution of the overall center of gravity of the all-terrain vehicle 2 to improve operation controllability of the all-terrain vehicle 2.

The second efficacy of the present invention is that the fuel tank 24 comprises the body portion 241, and the body portion 241 is provided, as being extended in a direction toward the rear side of the vehicle body, with the rear fuel accommodation extension section 244, and the rear fuel accommodation extension section 244 comprises a left-side rear fuel accommodation extension section 2441, a right-side rear fuel accommodation extension section 2442 and an accommodation recess 2443 between the left-side rear fuel accommodation extension section 2441 and the right-side rear fuel accommodation extension section 2442, the accommodation recess 2443 being provided for accommodating a portion of tubes of the rear ancillary tube assembly 214, whereby the weight of the fuel tank 24 can be increased and the weight of the fuel tank 24 can be used to adjust the distribution of the overall center of gravity of the all-terrain vehicle 2 to improve operation controllability of the all-terrain vehicle 2.

The third efficacy of the present invention is that the fuel tank 24 comprises the body portion 241 and the body portion 241 is provided, as being extended in the vehicle body width direction, with the lateral fuel accommodation extension section 242, the lateral fuel accommodation extension section 242 having at least a portion located above the rear wheels 26, whereby the weight of the fuel tank 24 can be increased and the weight of the fuel tank 24 can be used to adjust the distribution of the overall center of gravity of the all-terrain vehicle 2 to improve operation controllability of the all-terrain vehicle 2.

The fourth efficacy of the present invention is that the fuel tank 24 is provided, on one side thereof, with the positioning pillars 24a, and the positioning pillars 24a extend through a thermal insulation member 5 to penetrate into the fuel tank positioning sections 21a of the vehicle frame unit 21; and the fuel tank 24 is provided and covered, at outside of the side that is opposite to the positioning pillars 24a, with a protection cover 6, whereby, on the one hand, an effect of positioning the left side of the fuel tank 24 is achieved, and on the other hand, isolation provided by the thermal insulation member 5 prevents the left side of the fuel tank 24 from being affected by a high temperature of the muffler 281 of the exhaust unit 28 and an effect of protecting the outside of the right half of the fuel tank 24 is provided.

The fifth efficacy of the present invention is that a cushioning member C is provided between the bottom 243a of the lower buffering fuel accommodation extension section 243 of the fuel tank 24 and the cross tube 21421 of the rear ancillary tube assembly 214, whereby collision and abrasion between the bottom 243a of the lower buffering fuel accommodation extension section 243 and the cross tube 21421 of the rear ancillary tube assembly 214 can be prevented and an effect of shock absorption for the fuel tank 24 can also be improved.

The sixth efficacy of the present invention is that a portion of the bottom 243a of the lower buffering fuel accommodation extension section 243 of the fuel tank 24 that is close to a center thereof is the lowest point of the fuel tank 24 toward the lower side of the vehicle body, whereby, on the one hand, the fuel storage capacity of the fuel tank 24 can be increased, and on the other hand, stability of the liquid surface of the fuel stored in the fuel tank 24 can be stabilized.

The seventh efficacy of the present invention is that the body portion 241 is provided with the fuel pump assembly 3 and the ventilation device 4, and the fuel pump assembly 3 comprises a fuel drawing opening and a fuel conveyance port 31, the fuel drawing opening being located in the fuel tank 24 at the lowest position, the fuel conveyance port 31 being connected to a fuel conveyance pipe P, whereby the effect of supplying fuel from the fuel tank 24 can be improved.

The eighth efficacy of the present invention is that the lower buffering fuel accommodation extension section 243 is formed by having the body portion 241 extended in the vehicle body width direction as sloping downward and from the outside to the inside in two sides, wherein a distance that a part of the lower buffering fuel accommodation extension section 243 that is close to a center is spaced from the upper end face 241a of the body portion 241 is greater than distances that two sides of the lower buffering fuel accommodation extension section 243 are spaced from the upper end face 241a of the body portion 241, and a length of the lower buffering fuel accommodation extension section 243 extending in the vehicle body width direction is greater than a width thereof in the front-rear direction of the vehicle body, whereby the stiffness and strength of the fuel tank 24 can be improved and the weight of the fuel tank 24 can be increased and the weight of the fuel tank 24 can be used to adjust the distribution of the overall center of gravity of the all-terrain vehicle 2 to improve operation controllability of the all-terrain vehicle 2.

The ninth efficacy of the present invention is that the upper end face 242a of the lateral fuel accommodation extension section 242 is provided with the fuel filling opening 2421 and the fuel filling opening 2421 is covered by a fuel filling opening cap 2422; the upper end face 242a of the lateral fuel accommodation extension section 242 is raised more toward the upper side in the up-down direction of the vehicle body than the upper end face 241a of the body portion 241, and the bottom face 242b of the lateral fuel accommodation extension section 242 is set in an inclined form; the fuel filling opening 2421 is arranged at a side that is opposite to the muffler 281 of the exhaust unit 28 in the vehicle body width direction, whereby the stiffness and strength of the fuel tank 24 can be improved and safety of fueling in the fuel tank 24 can be improved.

The tenth efficacy of the present invention is that the upper end face 2442a of the right-side rear fuel accommodation extension section 2442 is raised more toward the upper side in the up-down direction of the vehicle body that the upper end face 241a of the body portion 241 and the upper end face 2441a of the left-side rear fuel accommodation extension section 2441; the upper end face 2442a of the right-side rear fuel accommodation extension section 2442 is provided with a ventilation device 4 in communication with the right-side rear fuel accommodation extension section; whereby the stiffness and strength of the fuel tank 24 and the smoothness of supplying of fuel can be improved and the weight of the fuel tank 24 can be increased and the weight of the fuel tank 24 can be used to adjust the distribution of the overall center of gravity of the all-terrain vehicle 2 to improve operation controllability of the all-terrain vehicle 2.

The eleventh efficacy of the present invention is that the accommodation recess 2443 is provided for accommodating the upright tube 21422 of the right-side rear ancillary tube 2142 of the rear ancillary tube assemblies 214 of the vehicle frame unit 21, whereby assembling of the fuel tank 24 is made easy.

The twelfth efficacy of the present invention is that the bottom 243a of the lower buffering fuel accommodation extension section 243 is arranged adjacent to the cross tube 21421 of the right-side rear ancillary tube 2142 of the rear ancillary tube assemblies 214, whereby assembling of the fuel tank 24 is made easy.

In summary, with the fuel tank structure of the all-terrain vehicle described above, the present invention may achieve the purposes and advantages as stated and is thus novel and inventive.

I claim:

1. A fuel tank structure of an all-terrain vehicle, wherein the all-terrain vehicle at least comprises a vehicle frame unit, a fuel tank arranged on the vehicle frame unit, a seat cushion arranged on the vehicle frame unit, a pair of rear wheels rotatably mounted to a rear section of the vehicle frame unit, a power unit arranged on the vehicle frame unit, the power unit being connected to an exhaust unit, the vehicle frame unit at least comprising a rear carrier rack and a rear ancillary tube assembly, the fuel tank being arranged rearwardly of the power unit and located below the rear carrier rack, characterized in that the fuel tank comprises a body portion, the body portion being formed with a lower buffering fuel accommodation extension section extending in a direction toward a lower side of the vehicle body, wherein lower buffering fuel accommodation extension section is formed by having the body portion extending in a vehicle body width direction toward a lower side of a vehicle body and inclining from outside to inside at each of two opposite sides, the lower buffering fuel accommodation extension section having a bottom that is adjacent to the rear ancillary tube assembly.

2. The fuel tank structure of the all-terrain vehicle according to claim 1, wherein the fuel tank has a side that is provided with a positioning pillar, the positioning pillar extending through a thermal insulation member and penetrating into a fuel tank positioning section of the vehicle frame unit; and the fuel tank is provided with a protection cover that is arranged at one side that is opposite to the positioning pillar to cover an outside thereof.

3. The fuel tank structure of the all-terrain vehicle according to claim 1, wherein a cushioning member is arranged between a bottom of the lower buffering fuel accommodation extension section of the fuel tank and a cross tube of the rear ancillary tube assembly.

4. The fuel tank structure of the all-terrain vehicle according to claim 3, wherein a portion of the bottom of the lower buffering fuel accommodation extension section of the fuel tank that is close to a center is a lowest point of the fuel tank toward a lower side of the vehicle body.

5. The fuel tank structure of the all-terrain vehicle according to claim 1, wherein a portion of a bottom of the lower buffering fuel accommodation extension section of the fuel tank that is close to a center is a lowest point of the fuel tank toward a lower side of the vehicle body.

6. The fuel tank structure of the all-terrain vehicle according to claim 1, wherein the body portion is provided with a fuel pump assembly, and the fuel pump assembly comprises a fuel conveyance port, the fuel conveyance port being connected to a fuel conveyance pipe.

7. The fuel tank structure of the all-terrain vehicle according to claim 1, wherein the lower buffering fuel accommodation extension section is formed by having the body portion extended in the vehicle body width direction as sloping downward and from outside to inside in two sides; a part of the lower buffering fuel accommodation extension section that is close to a center is spaced from the upper end face of the body portion by a distance that is greater than a distance by which two side portions of the lower buffering fuel accommodation extension section are spaced from the upper end face of the body portion; and a length of the lower buffering fuel accommodation extension section extending in the vehicle body width direction is greater than a width thereof extending in a front-rear direction of the vehicle body.

8. The fuel tank structure of the all-terrain vehicle according to claim 1, wherein the lower buffering fuel accommodation extension section has a bottom that is adjacent to a cross tube of the right-side rear ancillary tube of the rear ancillary tube assembly.

9. A fuel tank structure of an all-terrain vehicle, wherein the all-terrain vehicle at least comprises a vehicle frame unit, a fuel tank arranged on the vehicle frame unit, a seat cushion arranged on the vehicle frame unit, a pair of rear wheels rotatably mounted to a rear section of the vehicle frame unit, a power unit arranged on the vehicle frame unit, the power unit being connected to an exhaust unit, the vehicle frame unit at least comprising a rear carrier rack and a rear ancillary tube assembly, the fuel tank being arranged rearwardly of the power unit and located below the rear carrier rack, characterized in that the fuel tank comprises a body portion, the body portion being formed with a rear fuel accommodation extension section extending in a direction toward a rear side of the vehicle body, the rear fuel accommodation extension section comprising a left-side rear fuel accommodation extension section, a right-side rear fuel accommodation extension section, and an accommodation recess between the left-side rear fuel accommodation extension section and the right-side rear fuel accommodation extension section, the accommodation recess receiving a portion of tubes of the rear ancillary tube assembly to accommodate therein.

10. The fuel tank structure of the all-terrain vehicle according to claim 9, wherein the right-side rear fuel accommodation extension section has an upper end face that is raised more toward an upper side of an up-down direction of the vehicle body that an upper end face of the body portion and an upper end face the left-side rear fuel accommodation extension section; the upper end face of the right-side rear fuel accommodation extension section is provided with a ventilation device that is in communication with the right-side rear fuel accommodation extension section.

11. The fuel tank structure of the all-terrain vehicle according to claim 9, wherein the accommodation recess receives an upright tube of the right-side rear ancillary tube of the rear ancillary tube assembly of the vehicle frame unit.

12. The fuel tank structure of the all-terrain vehicle according to claim 9, wherein the fuel tank has a side that is provided with a positioning pillar, the positioning pillar extending through a thermal insulation member and penetrating into a fuel tank positioning section of the vehicle frame unit; and the fuel tank is provided with a protection cover that is arranged at one side that is opposite to the positioning pillar to cover an outside thereof.

13. The fuel tank structure of the all-terrain vehicle according to claim 9, wherein the body portion is provided with a fuel pump assembly, and the fuel pump assembly comprises a fuel conveyance port, the fuel conveyance port being connected to a fuel conveyance pipe.

14. A fuel tank structure of an all-terrain vehicle, wherein the all-terrain vehicle at least comprises a vehicle frame unit, a fuel tank arranged on the vehicle frame unit, a seat cushion arranged on the vehicle frame unit, a pair of rear wheels rotatably mounted to a rear section of the vehicle frame unit, a power unit arranged on the vehicle frame unit, the power unit being connected to an exhaust unit, the vehicle frame unit at least comprising a rear carrier rack and a rear ancillary tube assembly, the fuel tank being arranged rearwardly of the power unit and located below the rear carrier rack, characterized in that the fuel tank comprises a body portion, the body portion being formed with a lateral fuel accommodation extension section extending in a vehicle body width direction, the lateral fuel accommodation extension section having at least a portion above the rear wheels, such that at least a portion of the lateral fuel accommodation extension section casts a projection that overlaps the rear wheels.

15. The fuel tank structure of the all-terrain vehicle according to claim 14, wherein the lateral fuel accommodation extension section has an upper end face that is provided with a fuel filling opening, the fuel filling opening being covered with a fuel filling opening cap; the upper end face of the lateral fuel accommodation extension section is raised more toward an upper side in an up-down direction of the vehicle body than an upper end face of the body portion; the lateral fuel accommodation extension section has a bottom face that is inclined; the fuel filling opening is arranged at a side that is opposite to a muffler of the exhaust unit in the vehicle body width direction.

16. The fuel tank structure of the all-terrain vehicle according to claim 14, wherein the fuel tank has a side that is provided with a positioning pillar, the positioning pillar extending through a thermal insulation member and penetrating into a fuel tank positioning section of the vehicle frame unit; and the fuel tank is provided with a protection cover that is arranged at one side that is opposite to the positioning pillar to cover an outside thereof.

17. The fuel tank structure of the all-terrain vehicle according to claim 14, wherein the body portion is provided with a fuel pump assembly, and the fuel pump assembly comprises a fuel conveyance port, the fuel conveyance port being connected to a fuel conveyance pipe.

\* \* \* \* \*